UNITED STATES PATENT OFFICE.

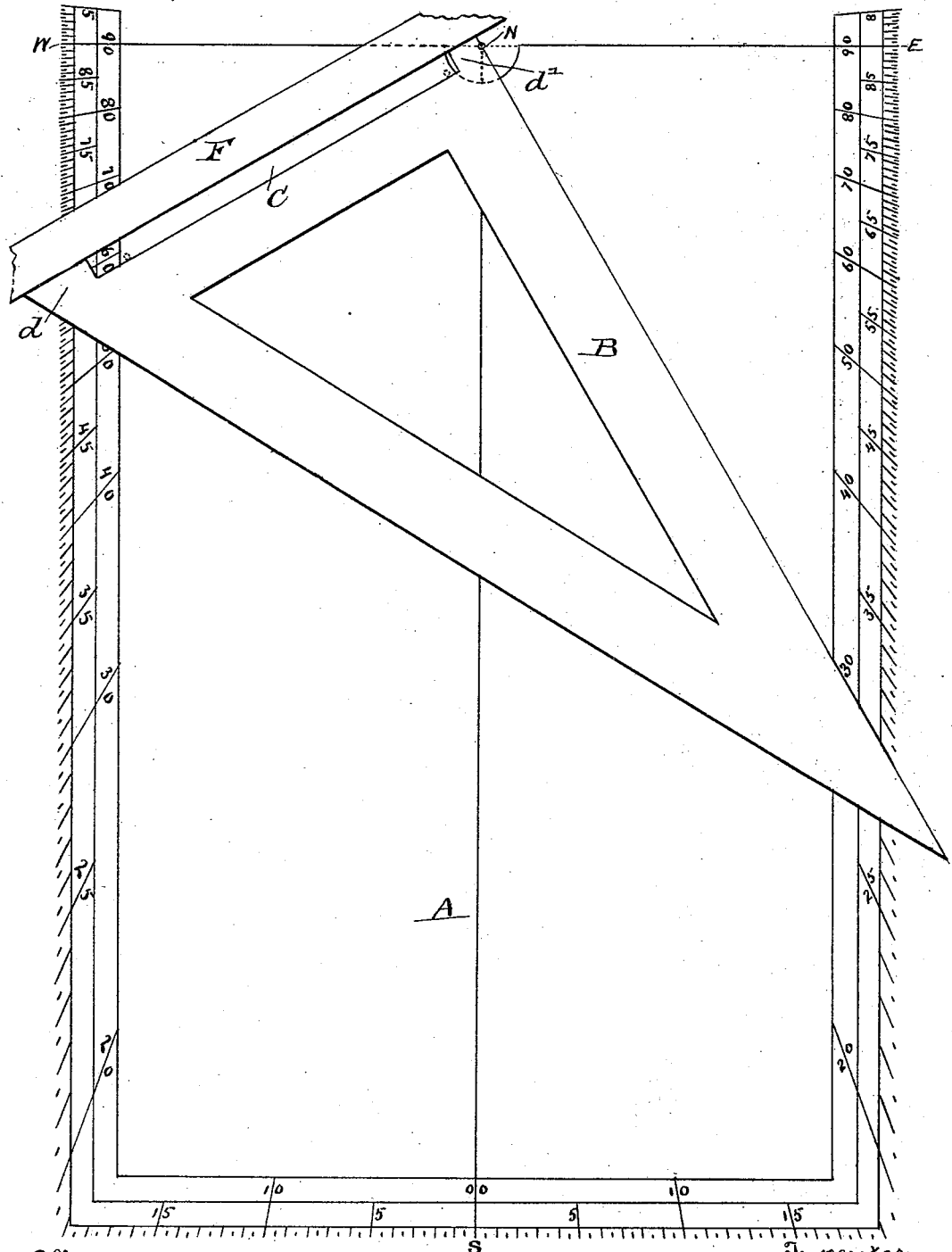

DANIEL C. HUDSON, OF BERLIN, MARYLAND.

PLOTTER.

SPECIFICATION forming part of Letters Patent No. 492,682, dated February 28, 1893.

Application filed December 1, 1891. Serial No. 413,676. (No model.)

*To all whom it may concern:*

Be it known that I, DANIEL C. HUDSON, a citizen of the United States, residing at Berlin, in the county of Worcester and State of Maryland, have invented certain new and useful Improvements in Protractors; and I do hereby declare the following to be a full, clear, and exact description of the invention, such as will enable others skilled in the art to which it appertains to make and use the same.

My invention relates to protractors or plotting charts used in plotting and drafting, and it consists of certain improvements in a protractor or chart and a triangle used in connection therewith, as hereinafter described and claimed.

The objects of my invention are the construction of an apparatus more simple in form, and cheaper in construction, more easily understood and operated, and whereby surveyors' field notes and angles, or notes and angles for other purposes may be plotted or drafted more rapidly and accurately and with less strain upon the eyes, than with any of the ordinary forms of protractors with which I am acquainted. Protractors in common use, besides being somewhat expensive in construction, are small, compared with the size of the drawings to be made—hence errors in taking angles from them are increased in the enlarged work, and great and careful labor is necessary to make a correct transfer and draft.

My invention consists in a plotting chart for drafting the angles of surveyors' field notes, and other like purposes, having its sides and one end divided into degrees, indicating all those angles of a circle that may practically be drawn from a common center, and having a space inclosed by said graduated sides and end of such dimensions as to contain a draft or plot of the work to be made within the protractor or chart, and having a central north point, and from which all required angles may be transferred and drawn from any point within the said inclosed space and with a radius greater than the entire field covered by the work. In connection with such a protractor I employ a triangle of peculiar construction especially adapted thereto to aid in transferring the angles.

The improvements constituting my invention are illustrated in the accompanying drawing, which is a plan view of the protractor with triangle applied.

Referring to the drawing A is a protractor, or chart, rectangular in form, and having the sides and one end (east, west, and south) divided into degrees, and parts of degrees as in other rectangular protractors. The upper ungraduated or north end is provided at the center of its horizontal plane with a point N. There is no limitation as to the size of this protractor or chart, but an important point had in view is that, the space inclosed by its graduated sides and end shall be of such dimensions as to contain a draft or plot of the work to be made, thus obviating the use of inconvenient and cumbersome instruments, and necessitating only the employment of a ruler, triangle, a pair of dividers, and a scale for measuring distances. Such a protractor or chart may be constructed of, or upon any suitable material, such as paper, metal, glass, or wood, upon which a plane or level surface can be made, and into which or upon which the required angles and figures may be printed, marked, or engraved.

Bristol board in sheets will be found convenient for small drafts, but the charts can be printed upon continuous rolls of paper at suitable intervals, either as a whole or by dividing the chart at the north and south line into halves, placing one half to the right and the other to the left. The angles can be taken from the chart in either case and transferred by a triangle and ruler to any point desired.

Drawings can be made upon the chart itself, or on the paper or other material as desired, by simply sticking it to the chart at a few points along the outer edges with mucilage or any other convenient substance.

The chart is so constructed that it can be used either with or without a center-pin; but when a large number of angles are to be plotted the eye will be greatly assisted by firmly setting at the north point N, or common center of the chart, each a pin. This pin may be made something like a long thumb tack, or even a common sewing needle may be used.

B is the triangle constructed for use with this protractor or chart, and having a long cut C, made in its shortest side, leaving projections $d$, $d'$ at opposite ends of the cut. On the other side or edge of the triangle, about the middle of the projection $d$, is formed quite a small notch, equal in depth to one half of the diameter of the center pin.

When the triangle is used the notch is placed against the center pin, and an ordinary ruler, F, is placed against the ends of the projections $d, d'$, transforming when so placed, the cut out portion C of the triangle into a slot. When the triangle is first placed on the chart or protractor for the purpose of obtaining any angle, with the notch and ruler in position, as above described, while the ruler is held firmly down with one hand, with the other hand the triangle is withdrawn, moved slightly forward and replaced in such position that the center pin will fall into the slot like cut C, and travel along the same as the triangle is moved forward to the point from which the angle is to be drawn. As the triangle is thus moved forward the hand readily detects when the center-pin falls into this little notch, thereby greatly saving the strain upon the eye which is thus relieved of most of its work.

What I claim is—

1. A plotting chart for drafting the angles of surveyors' field notes, and other like purposes, having its sides and lower end divided into degrees and parts of degrees, indicating angles of a circle, a space inclosed by said sides and end of such dimensions as to contain a draft or plot of the work to be made within said space, and a point N, at the center of the upper or north end, whereby, with the aid of a triangle and ruler, all required angles may be transferred to and drawn from any point within the said inclosed space and with a radius greater than the entire field covered by the work, substantially as described.

2. In combination with a rectangular chart or protractor having graduated sides and end, a center-pin, and a triangle, one edge of which triangle is formed with a notch to engage with said center-pin, substantially as described.

3. In combination with a chart or protractor of a rectangular shape, having graduated sides and end, a center pin, and a triangle having a cut out portion on one side, with projections at opposite ends of said cut-out portion, substantially as and for the purpose described.

In testimony whereof I affix my signature in presence of two witnesses.

DANIEL C. HUDSON.

Witnesses:
W. G. DOOLITTLE,
CHAS. W. BLACKWOOD.